United States Patent
Schulze et al.

(10) Patent No.: US 12,138,713 B2
(45) Date of Patent: Nov. 12, 2024

(54) APPLIED FORCE DETERMINATION AND CONTROL IN JOINING PROCESS

(71) Applicant: II-VI DELAWARE, INC., Wilmington, DE (US)

(72) Inventors: Frank Schulze, Berlin (DE); Alexander Dobbert, Hannover (DE); Norbert Krost, Berlin (DE)

(73) Assignee: II-VI DELAWARE, INC., Wilmington, DE (US)

( * ) Notice: Subject to any disclaimer, the term of this patent is extended or adjusted under 35 U.S.C. 154(b) by 921 days.

(21) Appl. No.: 17/163,539

(22) Filed: Jan. 31, 2021

(65) Prior Publication Data

US 2021/0245281 A1    Aug. 12, 2021

Related U.S. Application Data

(60) Provisional application No. 62/971,483, filed on Feb. 7, 2020.

(51) Int. Cl.
*B23K 3/06* (2006.01)
*G01L 5/16* (2020.01)

(52) U.S. Cl.
CPC ............... *B23K 3/063* (2013.01); *G01L 5/16* (2013.01)

(58) Field of Classification Search
CPC .......... B23K 1/0056; B23K 3/063; G01L 5/16
See application file for complete search history.

(56) References Cited

U.S. PATENT DOCUMENTS

| 4,588,872 A * | 5/1986 | Bollinger ........... G05B 19/4207 318/575 |
| 2010/0276402 A1* | 11/2010 | Richard ............... B23K 9/0286 219/121.64 |
| 2017/0136587 A1* | 5/2017 | Wagner ................ B23K 26/342 |
| 2021/0094120 A1* | 4/2021 | Forrest ............. G05B 19/41875 |

FOREIGN PATENT DOCUMENTS

| EP | 1762328 B1 | 4/2008 |
| EP | 1742759 B1 | 5/2012 |
| EP | 2408585 B1 | 4/2015 |

* cited by examiner

*Primary Examiner* — Thien S Tran
(74) *Attorney, Agent, or Firm* — Blank Rome LLP

(57) ABSTRACT

Disclosed techniques compensate for variable forces applied to a brazing head in order to more accurately maintain application of a desired lateral force by a brazing wire, filling wire or tracking finger extending from the brazing head to a component. Orientation of the brazing head is determined relative to gravity and the angle of a movable arm of the brazing head relative to a support body of the brazing head. A lateral force value measured by a lateral force sensor is adjustable based on the determined orientation of the brazing head and the determined angle of the arm relative to the support body in order to provide a corrected or adjusted lateral force value. At least a portion of the brazing head is repositioned relative to the component if the corrected lateral force value deviates from a predetermined value.

20 Claims, 7 Drawing Sheets

APPLIED FORCE DETERMINATION AND CONTROL IN JOINING PROCESS

CROSS-REFERENCE TO RELATED APPLICATIONS

This application claims the benefit of U.S. Provisional Appl. No. 62/971,483 filed 7 Feb. 2020, which is incorporated herein by reference.

FIELD

The present disclosure generally relates to a process, such as a brazing process, for joining components. More particularly, but not exclusively, the present disclosure relates to systems and methods for determining and controlling force applied to a workpiece or component during a brazing process, such as a laser brazing process.

BACKGROUND

Unless otherwise indicated herein, the materials described herein are not prior art to the claims in the present application and are not admitted to be prior art by inclusion in this section.

Certain joining processes may be used to join different components or workpieces together. For example, brazing processes involve joining different components with a filler material which is melted and flows into or forms a joint between the different components. One particular form of brazing includes laser brazing where a filler material is melted with a laser and flows into or forms a joint between the different components. In one arrangement, the filler material may be a brazing wire which has a melting point which is lower than the melting point of the materials forming the components being joined, although forms in which the filler material may be a filling wire made from the same material as some or all of the components being joined are possible. The brazing wire or filling wire may be positioned between a laser beam and the components being joined, and is movable along a seam of the components during a brazing process to fill or create a joint between the components with the material of the brazing wire or the filling wire as it is melted with the laser.

During the brazing process, the brazing wire, filling wire, or some other portion of a brazing head may be positioned against one or both of the components and apply a force thereto before the brazing wire or the filling wire is melted with the laser. For example, in a brazing process which involves joining a first component which is positioned over a second component, the brazing wire may be positioned against and apply a lateral force to the first component. In another variation, a first component could be positioned adjacent to a second component, and the brazing wire may be positioned in a groove between the components while applying a lateral force to one of the components. For a successful brazing process, the brazing wire is moved along the seam while a force is kept constant on at least one of the components. Various complications may arise during the brazing process if the lateral force applied to the component deviates from a desired value or is not consistently, or substantially consistently, maintained. For example, the brazing wire may not accurately follow the seam between the components, and this may result in unsuccessful or undesired joining of the components, an esthetically undesired joint, or both.

Attempts to better control the lateral force applied to a component during a brazing process in order to avoid these issues have involved the use of a lateral force sensor intended to measure the lateral force applied to the component. However, certain forces acting on a brazing head other than the force attributable to the positioning of the brazing wire, filling wire or some portion of the brazing head against the component may not be accounted for by the lateral force sensor. As such, the lateral force sensor may not accurately represent the actual lateral force applied to the component. The brazing head may also be positioned in a number of different orientations as it is moved along the seam between components of complex geometries. Similarly, attempts to correct for these additional forces by measuring lateral force before a force is applied against the component do not account for effects on lateral force when the brazing head is positioned in different orientations, and likewise may not accurately provide the actual force applied to the component.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In one example embodiment, a method for joining components includes positioning a brazing head of a brazing apparatus relative to the components. The brazing head includes a support body and an arm movable relative to the support body. The method also includes sensing a lateral force when a brazing wire, filling wire, or tracking finger extending from the brazing head is positioned against one of the components to provide a sensed lateral force value, determining orientation of the brazing head relative to gravity to provide a determined orientation of the brazing head, and determining a position of the arm relative to the support body to provide a determined position of the arm relative to the support body. A lateral force value may be provided based on the sensed lateral force value, the determined orientation of the brazing head, and the determined angle of the arm relative to the support body. The method may also include repositioning at least a portion of the brazing head relative to the components if the lateral force value deviates from a predetermined lateral force target value.

In another example embodiment, a system for joining components includes a brazing head including a support body, an arm coupled to and movable relative to the support body, and a brazing wire, filling wire or tracking finger extending from the brazing head. The system also includes a force sensor configured to determine a lateral force when the brazing wire, filling wire or tracking finger is applied against a component, an orientation sensor positioned on the arm and configured to determine an orientation of the brazing head relative to gravity, and an arm position sensor configured to determine a position of the arm relative to the support body. A controller is in communication with the force sensor, the orientation sensor and the arm position sensor, and the controller is structured to adjust a lateral force value sensed by the sensor based on an orientation of the brazing head determined by the orientation sensor and a position of the arm relative to the support body determined by the arm position sensor.

In another example embodiment, a method includes moving a brazing head or one or more components of the brazing head through a range of configurations in the absence of interaction of the brazing head or a component of the brazing head with a workpiece. The method also includes sensing lateral force values in connection with the brazing head as the brazing head or one or more components thereof are moved through the range of configurations, and determining a correction value which should be applied to a lateral force value sensed during the joining process when the brazing head or one or more components thereof is in a particular configuration and a brazing wire, filling wire or tracking finger extending from the brazing head is positioned against and applies a lateral force to the workpiece.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

The present disclosure generally relates to joining processes which may be used to join different components or workpieces together. In some aspect, the disclosure relates to brazing, including laser brazing, and to techniques and systems for brazing. In particular, in some embodiments, a lateral force applied to a workpiece by a portion of a brazing head is determined while accounting for various forces which may act on the brazing head. Once the lateral force has been determined in this manner, the brazing head or a portion thereof may be moved to adjust the lateral force applied to the workpiece if the determined lateral force deviates from a predetermined value or a range of predetermined values for the lateral force. Although the embodiments are described in the context of a brazing process, and in particular a laser brazing process, it will be appreciated that embodiments disclosed herein may be employed in other fields and/or operating environments where the functionality disclosed herein may be useful. For example, the subject matter described herein may also be applicable to other joining processes, such as welding, which involve controlling the amount of lateral force applied to workpiece. Accordingly, the scope of the invention should not be construed to be limited to the exemplary implementations and operating environments disclosed herein.

Figure 1:
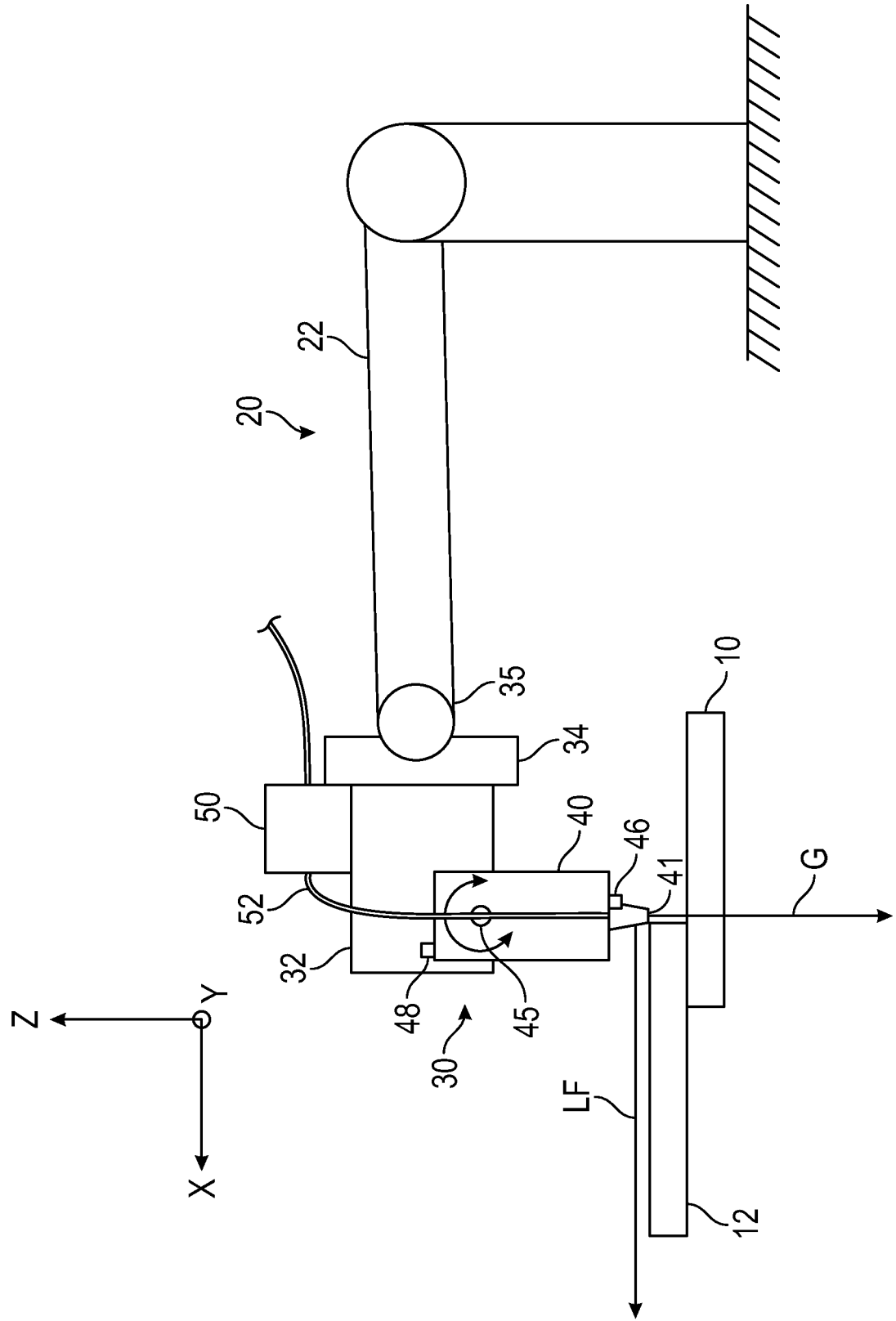
FIG. 1 is a schematic view of a laser brazing apparatus of the present disclosure.

FIG. 1 is a schematic view of a laser brazing apparatus 20 of the present disclosure. The apparatus 20 includes a laser brazing head 30 and may include other components not necessarily shown in FIG. 1. For example, the laser brazing apparatus 20 may also include one or more components structured to move all or part of the laser brazing head 30 relative to materials or components 10 and 12 joined together by the laser brazing apparatus 20. For example, the laser brazing head 30 may include a frame 34 coupled by a flange or other fixture 35 to one or more robotic arms 22 which may move the laser brazing head 30 in a variety of directions relative to the components 10 and 12. The laser brazing apparatus 20 may also include one or more components (not shown), such as a camera, laser range measuring devices, or triangulation sensors, structured to assist in positioning of the laser brazing head 30 relative to the components 10 and 12. As would be appreciated by a person skilled in the art, the additional components that may be included in the laser brazing apparatus 20 as identified herein are not exhaustive, and the inclusion of various other components not specifically identified herein is also possible.

Figure 2A:
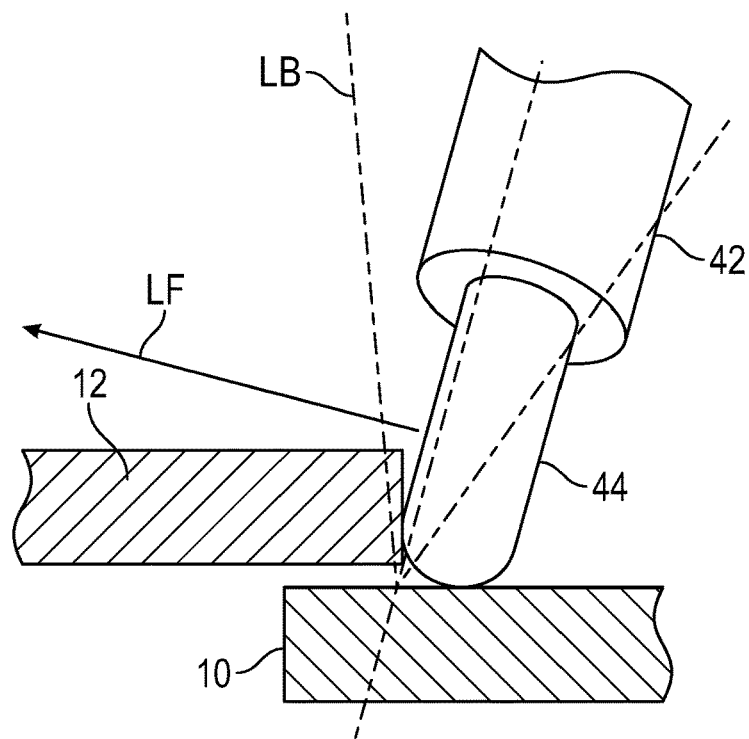
FIG. 2A is a schematic illustration of one configuration for positioning of a brazing wire relative to components during a laser brazing process.
Figure 2B:
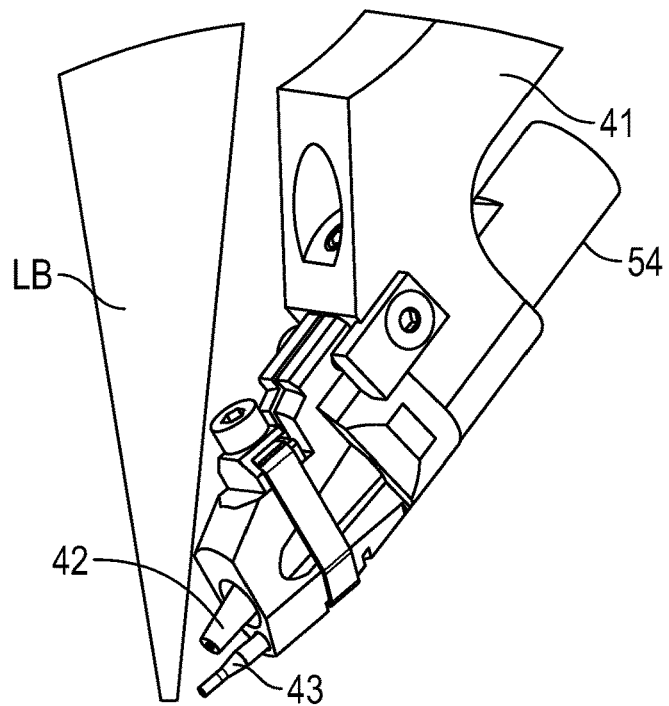
FIG. 2B is a perspective view of one configuration for a portion of the end of the arm.

As shown in FIG. 1, the brazing head 30 is positioned relative to the components 10, 12 so that an end 41 of an arm 40 of the brazing head 30 touches against at least one of the components 10, 12. This end 41 can be or can include a portion of a brazing wire, a filling wire, a tracking finger, a needle, or other appropriately shaped element, extension, or even some other portion on the arm 40 of the brazing head 30. As an example, FIG. 2A shows brazing wire 44 that extends from a supporting element or nozzle 42 of the end 41. The brazing wire 44 can track the seam between components 10, 12. As another example, FIG. 2B shows a tracking finger 43 on the end 41 that is used adjacent the nozzle 42 from which the brazing wire (not shown) exits to be melted by the laser beam LB. This tracking finger 43 can track the seam between components should the brazing wire be too soft. The lateral force sensor (46) would be located just above the end 41 in FIG. 2B. The cylinder 54 is the connection to the wire delivery cable (52). Other configurations are possible.

As shown in FIG. 1, the arm 40 can be articulated (i.e., rotated relative) to a support body 32 of the brazing head 30. For its part, the brazing head 30 itself can be articulated (translated, rotated, etc.) in any direction using the robotics 22 of the apparatus 20, as the case may be. During brazing operations, however, the head 30 is oriented so that the rotational axis of the arm 40 is (more or less) parallel to the seam between the components 10, 12. In FIG. 1, that means that the rotational axis of the arm 40 would lie along the Y-axis of the drawing, which is the axis along which the seam of the two components 10, 12 runs.

To ensure that proper brazing can be achieved, a target lateral force (LF) is applied to at least one of the components (e.g., 12) when the brazing process is performed. As depicted in FIG. 1, the lateral force (LF) to be controlled during the brazing process is the force between the arm's end 41 and the component 12. This targeted lateral force (LF) is determined and maintained during the brazing process using sensors and calculations as disclosed herein. First, an initial lateral force value is measured using a force sensor 46 disposed on the arm 40. This force sensor 46 measures a force of the end 41 positioned against the at least one component 12. However, this measurement of the initial lateral force from the sensor 46 includes influences from additional forces produced by other sources. In particular, the measured lateral force value is at least influenced by: (i) any tension from the deforming of the wire delivery cable 52, and (ii) the weight due to gravity of all of the elements connected below the lateral force sensor 46 (also including wire delivery cable 52) when its orientation is not exactly vertical. In general, all of the elements below the lateral force sensor 46 can be referenced as the end 41 of the arm 40, as labeled in the figures. To correct for these other force variables, the gravitational orientation of the body 32 (or the arm 40) is determined, and the angle between the body 32 and the arm 40 is determined. For example, a gravitational (G) orientation of the arm 40 can be determined directly using an orientation sensor 48 disposed on the arm 40, and a relative position of the arm 40 can be determined in relation to the support body 32 using an encoder 45 or other orientation sensor. Alternatively, the gravitational (G) orientation of the body 32 can be determined using an orientation sensor (not shown) on the body 32, and the relative position of the arm 40 to the support body 32 from the encoder 45 or other orientation sensor can be used to determine the gravitational (G) orientation of the arm 40.

As a correction, a corrected lateral force value is then calculated based on the measured lateral force value from the force sensor 46, the gravitational (G) orientation of the brazing head 30, and the relative position of the arm 40 in relation to the support body 32 of the head 30. Should it be necessary, at least a portion of the brazing head 30 is then repositioned relative to the at least one component 12 in response to the calculated lateral force value deviating from a target value. For example, the arm 40 can be articulated to correct the lateral force toward the target value.

As further shown in FIG. 1, the brazing head 30 can include a wire feeder 50 positioned on a frame 34 to which the support body 32 of the head 30 is coupled. A wire delivery cable 52 extends between the wire feeder 50 and a portion of the arm 40. During the brazing process, the wire feeder 50 feeds brazing wire or the like through the delivery cable 52 to the end 41, which is adjacent the lasing process adjacent the components 10 and 12. This configuration of the feeder 50 and cable 52 can impact the lateral force determined during operations. To that end, a relative position between the arm 40 and the wire feeder 50 can also be determined. The calculated lateral force value as disclosed herein can thereby be based on the sensed lateral force value, the determined gravitation (G) orientation of the brazing head 30, the determined position of the arm 40 relative to the support body of the head 30, and the determined relative positioning of the arm 40 and the wire feeder 50. Additional calculations can be made to adjust the lateral force value and can compensate for variable forces attributable to one or both of mass of a portion of the brazing head 30 and the wire delivery cable 52 coupled to the arm 40 upon movement of the brazing head 30. These and other features are described in more detail below.

In FIG. 1, the laser brazing head 30 is positioned relative to the components 10 and 12 where one component 12 is positioned on (or overlapping) the other component 10 to produce a seam. This overlapping arrangement is illustrated in FIG. 2A. In this example, the brazing wire 44 extends from a supporting element 42 or nozzle of the arm (40) and is pushed against one of the components 12 for proper brazing. The laser beam LB melts the brazing wire 44. When the brazing material is melted, the heated material flows between the overlapping portions of the components 10, 12 to create a brazed joint or seam.

As will be appreciated, the laser brazing head 30 of FIG. 1 may be positioned relative to and used to join the components 10 and 12 when the components 10 and 12 are configured differently. Illustrations of some example alternative configurations between the components 10 and 12 which may be joined by the laser brazing head 30 are provided in FIGS. 2C-2E.

Figure 2C:
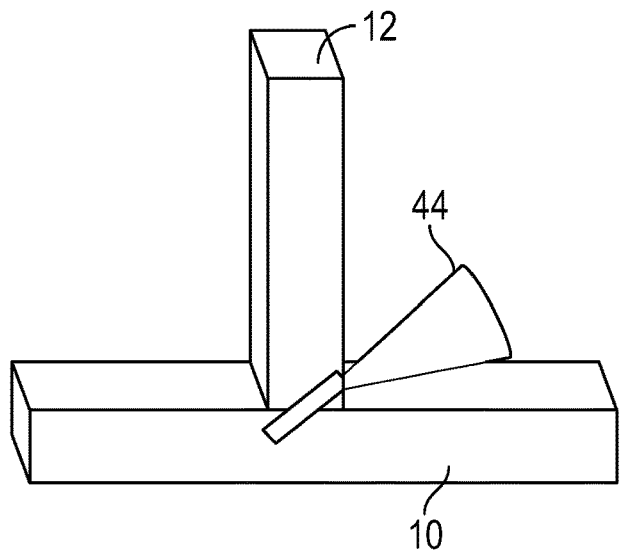
FIGS. 2C-2E schematically illustrate other configurations for positioning brazing wire positioned relative to components during a laser brazing process.

In FIG. 2C for example, one component 10 is positioned on the other component 12, and the long axes of the components 10 and 12 generally extend orthogonally to one another. This T-like geometry is typical for battery frame welding or brazing applications with wire.

Figure 2D:
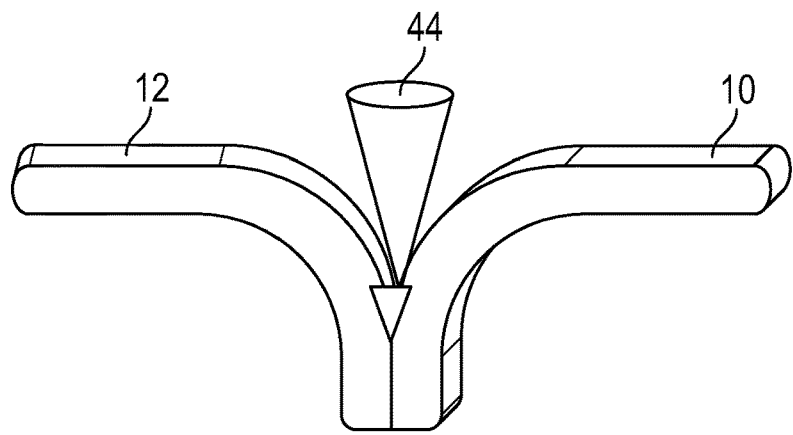

In FIG. 2D, the components 10 and 12 have an arcuate portion and portions of the components 10 and 12 adjacent the arcuate portion are positioned adjacent one another. This results in a groove or space in which a filler material may be deposited to join the components 10 and 12.

Figure 2E:
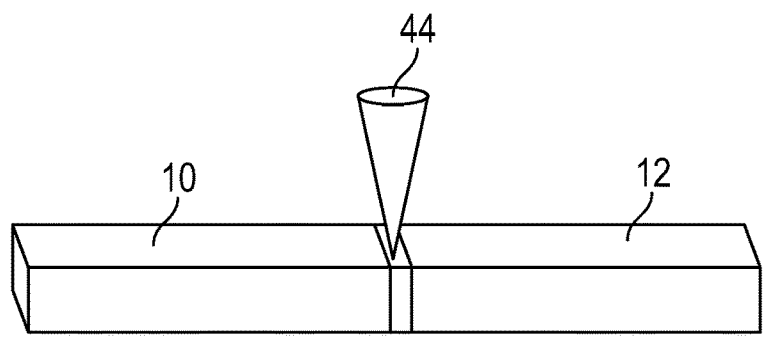

In FIG. 2E, one component 10 is positioned adjacent the other component 12 with the surfaces thereof generally being flush with one another. A filler material may be positioned between the components 10 and 12, across the surfaces of the components 10 and 12, or both to form a butt joint.

The different configurations between the components 10 and 12 as illustrated in FIGS. 2A and 2C-2E are not exhaustive with respect to the different configurations of components which may be joined using the laser brazing head 30. The description that follows is provided in connection with the component configuration present in FIG. 2A for the sake of discussion. It will be appreciated that the subject matter disclosed herein may also be applied to and used in connection with other component configurations including, but not limited to, the configurations illustrated in FIGS. 2C-2E.

Figure 3A:
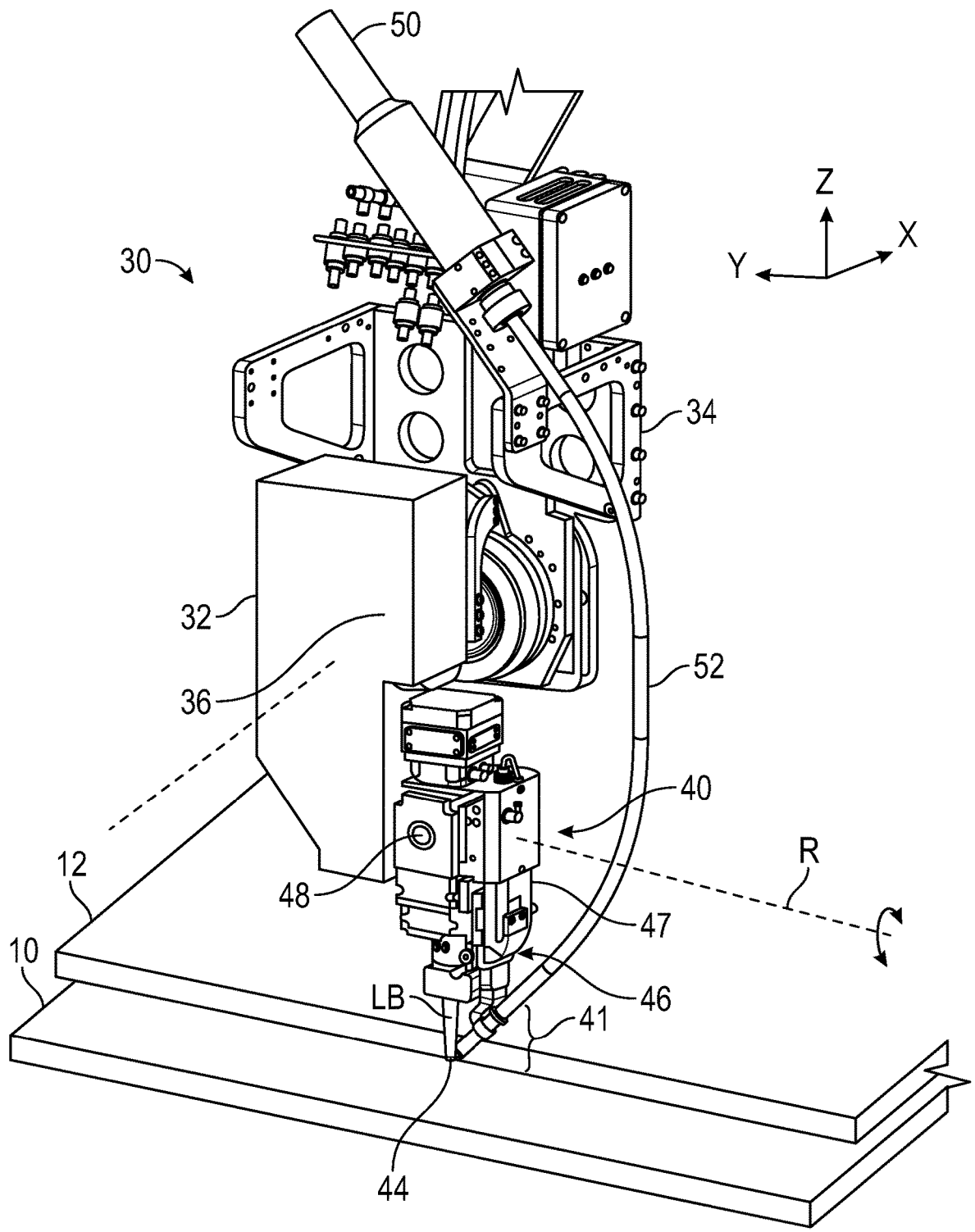
FIG. 3A is a perspective view of a laser brazing head of a laser brazing apparatus.
Figure 3B:
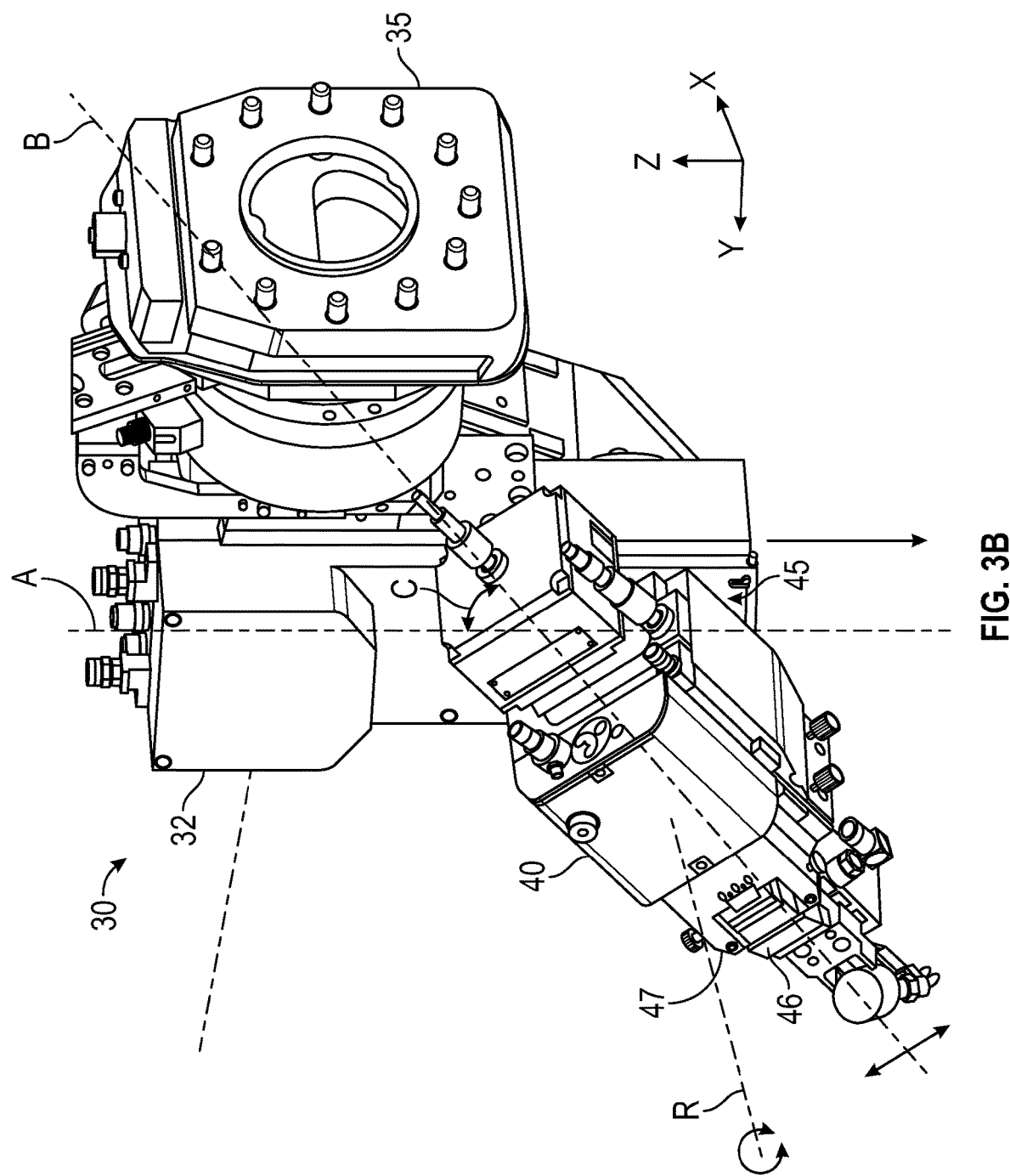
FIG. 3B is an enlarged perspective view of a portion of the laser brazing head illustrated in FIG. 3A.
Figure 3C:
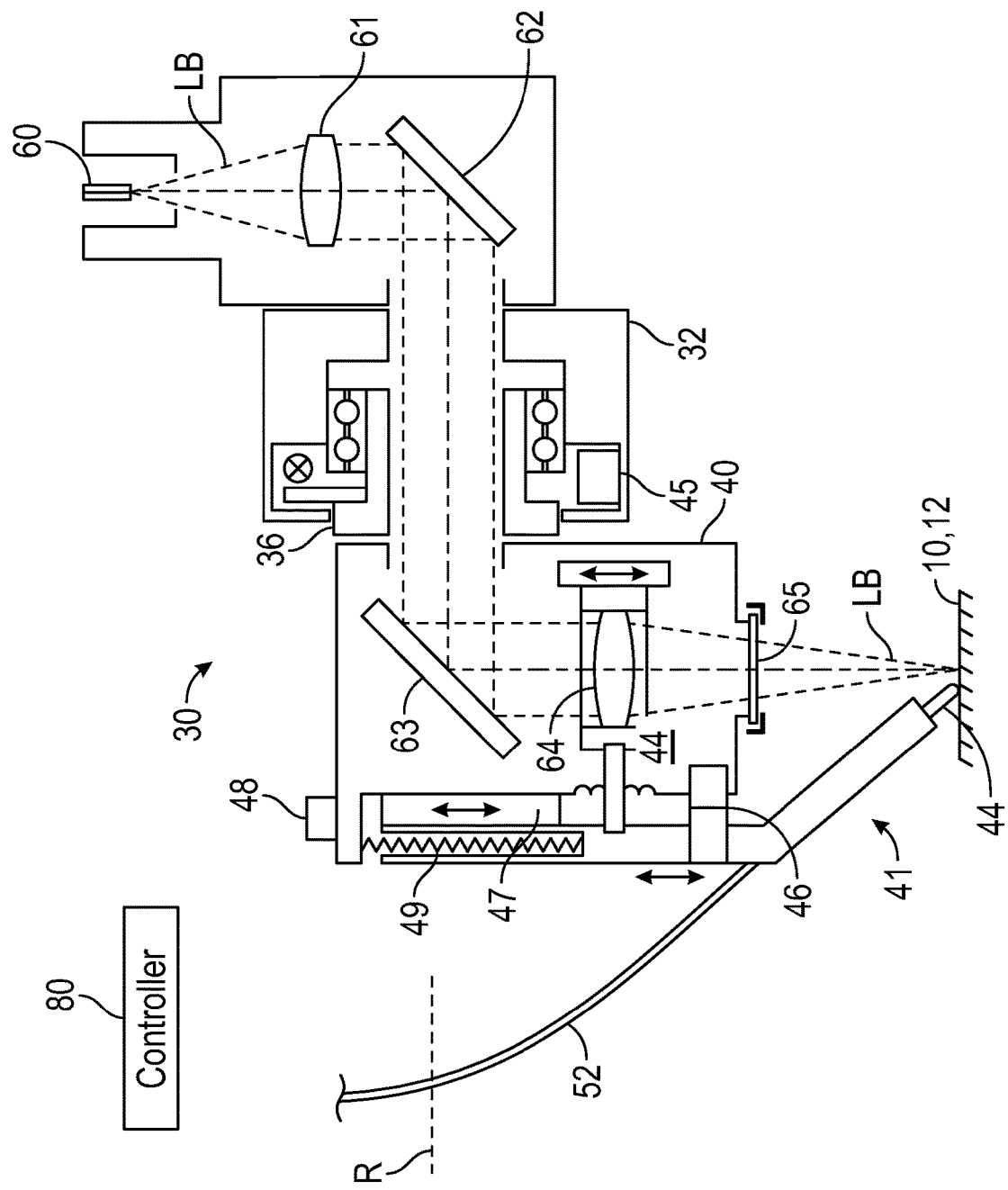
FIG. 3C is a schematic view of a portion of a laser brazing head of the present disclosure.

Looking at the laser brazing head 30 in more detail, FIG. 3A shows a perspective view of a laser brazing head 30 for a laser brazing apparatus (not shown), and FIG. 3B is an enlarged perspective view of a portion of that laser brazing head illustrated in FIG. 3A. Additionally, FIG. 3C shows a schematic view of the enlarged part of laser brazing head 30 of the present disclosure. Not all of the components of the laser brazing head 30 are shown in each of FIGS. 3A-3C. In general, the laser brazing head 30 includes a support body 32, a frame 34 to which the support body 32 is coupled, and an arm 40 coupled to the support body 32. FIG. 3A shows each of these components in addition to a wire feeder 50 and a wire delivery cable 52. FIG. 3B shows a different view of portions of the head 30 with the arm 40 articulated, but some features of the support body 32, the wire feeder 50, the cable 52 and the like are not shown for simplicity. Finally, FIG. 3C is simply a schematic view of the elements of the head 30, and not all features, such as the support body 32, the wire feeder 50, and the like, are not depicted.

In FIG. 3A, the head 30 is shown relative to example components or workpieces 10, 12 to be joined. The laser brazing head 30 includes, amongst other features, the support body 32 and the frame 34 to which the support body 32 is coupled. The support body 32 may be movable relative to the frame 34 to assist with tracking of the laser brazing head 30 along a seam between the components 10 and 12. However, the support body 32 may also be stationary relative to the frame 34.

The arm 40 is coupled to the support body 32, and a motor 36 on the support body 32 is structured to move the arm 40 relative to the support body 32 to facilitate proper positioning of an end 41 of the arm 40 relative to the components 10 and 12. A wire feeder 50 is coupled to the frame 34 and is structured to feed a brazing wire 44 through a wire delivery cable 52. In other arrangements, a filling wire may be used and may be fed by the wire feeder 50 through the wire delivery cable 52. The wire 44 may extend from the wire delivery cable 52 at the end 41 of the arm 40 and be positioned in the path of a laser beam LB.

As described here, the end 41 represents the components of the arm 40 connected via the lateral force sensor 46 to the rest of arm 40 so that the end 41 refers to the assembly connected below force sensor 46. The wire feeding cable 52 is attached to this end 41. The force sensor 46 thereby measures all of the forces on the end 41 that are lateral (i.e., perpendicular) to the arm 40, including strain and weight of the feeding cable 52. For the orientation shown in FIG. 1, the lateral force sensor 46 would measure the force along the X axis.

During operation, the laser beam LB melts the wire (44) so the material of the wire (44) may flow between and join the components 10 and 12. While not visible in FIGS. 3A-3B, an extension or a tracking finger (e.g., 43 in FIG. 2B), which may be in the form of a wire or needle shaped element (just to provide a few non-limiting examples), may extend from the end 41 of the arm 40.

During typical operations, only the wire 44 as in FIG. 2A makes contact to the components 10, 12 and is used for tracking along the seam. However, in some implementations, the wire 44 is too soft for this so additional support is needed from a fixed element, such as a tracking finger, needle, or other appropriately shaped element extension. That fixed element, such as the tracking needle 43 in FIG. 2B, is also connected to the arm's end 41. In this case, the process can automatically control the force between the fixed element and at least one of the components 10, 12 for tracking and moving the laser brazing head 30 along a seam between the components 10 and 12 with a controlled force.

When the end 41 of the arm 40 is positioned relative to the components 10, 12 as illustrated in FIG. 3A, for example, the wire 44 may be positioned against and apply a lateral force against one of the components 10, 12 during a laser brazing process in the direction of arrow LF shown in FIG. 2A. Alternatively, when present, a fixed element (e.g., tracking finger 43) extending from the end 41 of the arm 40 may be positioned against and apply a lateral force against one of the components 10, 12 during a laser brazing process in the direction of arrow LF shown in FIG. 2A.

As shown in FIG. 3A, the laser brazing head 30 includes a lateral force sensor 46 positioned on the arm 40. The lateral force sensor 46 is disposed between the end 41 and the rest of the arm 40. The lateral force sensor 46 is structured to measure or determine a value for the lateral force on the end 41. In some arrangements, the lateral force applied against the component 12 by the end 41 (e.g., brazing wire 44, filling wire, or tracking finger 43) may be determined from data associated with the motor 36 that moves the arm 40 to position the end 41 (e.g., the brazing wire 44, filling wire, or tracking finger 43) against, and apply lateral force to, the component 12. For example, electrical current data from the motor 36 could be associated with the amount of force applied to the component 12 because, for example, it may be assumed that a higher strength of electrical current used by the motor 36 may correspond to a higher amount of lateral force applied to the component 12. In this case, the force on the complete arm 40 can be derived from the motor data. As a drawback, however, the arm 40 has significant weight so calculations will need to subtract two relatively large numbers to obtain the relatively small lateral force on the components 10, 12.

However, the value for the lateral force which is determined by the lateral force sensor 46 may be influenced by forces in addition to those resulting from the positioning of the end 41 (e.g., the brazing wire 44, filling wire, or tracking finger 43) against the component 12. For example, some components of the laser brazing head 30 are positioned below the lateral force sensor 46. Therefore, gravitational forces may variably affect the lateral force value sensed by the lateral force sensor 46 as the orientation of all or part of the laser brazing head 30 changes during a laser brazing process. In other words, depending on the shape and contour of the components 10 and 12, all or part of the laser brazing head 30 moves relative to the components 10 and 12 to ensure the laser brazing head 30 properly tracks along the seam between the components 10 and 12 so that changes in gravitational force may occur. In addition, the brazing wire delivery cable 52 is coupled to the end 41 of the arm 40 and may itself exert a variable force onto the end 41 of the arm 40 as the arm 40 is moved relative to the support body 32.

The laser brazing head 30 also includes a number of additional components structured to determine various operational aspects of the laser brazing head 30, and the determinations made by these components may be used to correct or adjust a lateral force value sensed by the lateral force sensor 46. For example, the laser brazing head 30 includes an orientation sensor 48 which is positioned for example on the arm 40. The orientation sensor 48 is configured to determine an orientation of the arm 40 relative to the direction of gravitational forces acting on the laser brazing head 30. While the orientation sensor 48 is positioned on the arm 40 in the illustrated arrangement, the orientation sensor 48 may also be positioned on the support body 32 or the frame 34, just to provide a few possibilities. As discussed below for such a possibility, the angular encoder 45 can be used to convert the reading from an orientation sensor on the body 32 or frame 34 to an actual orientation of the arm 40 with respect to gravity.

In addition to this orientation sensor 48, the laser brazing head 30 may include one or more additional orientation sensors. In arrangements where more than one orientation sensor is present, an average of the orientation values of the laser brazing head 30 can be sensed or determined by each of the orientation sensors, or the additional sensor(s) may be used to detect potential abnormalities with respect to a dedicated orientation sensor from which a determined orientation value will be used In the illustrated arrangement, the orientation sensor 48 may determine the orientation of the arm 40 across a range of orientations relative to gravity. In this manner, the gravitational force applied to the end 41 of the arm 40 below the lateral force sensor 46 in a range of "process-relevant" orientations may be accounted for in a correction or adjustment of the lateral force value determined by the lateral force sensor 46 during a laser brazing process. Further details of this are provided below.

In addition to or in lieu of the orientation sensor 48, other techniques can be used for determining the orientation of the arm 40 across a range of orientations relative to gravity are possible. For example, when the laser brazing head 30 is coupled with one or more robotic arms which may move the laser brazing head 30 in a variety of directions, the control system for the robotic arms may provide relevant data from which the orientation of the laser brazing head 30 may be determined. As another example, data relating to the orientation of the laser brazing head may be programmed or stored into the control system 80 for the laser brazing head and a current orientation of the laser brazing head 30 may be determined from this data. Also, arrangements in which the orientation of the laser brazing head 30 relative to gravity remains fixed during a joining process are possible. In these arrangements, the orientation of the laser brazing head 30 may be provided by the orientation sensor 46, or it may be determined from or provided by orientation information corresponding to the fixed orientation of the laser brazing head 30 which may be programmed or stored into the control system for the laser brazing head 30.

As further shown in FIGS. 3A-3C, the laser brazing head 30 also includes a Z position sensor 47 which is positioned on the arm 40 and structured to determine the positioning of the end 41 of the arm 40 along an axis (B: FIG. 3B) of the arm 40. More specifically, during a laser brazing process, movement of the laser brazing head 30 will vary relative to the components 10 and 12, and the relative positioning between the arm 40 and its end 41 may change. As this occurs, tension on the wire delivery cable 52 may change, along with forces applied to the end 41 of the arm 40 by the wire delivery cable 52. Accordingly, the Z position sensor 47 is configured to determine the relative positioning between the arm 40 and its end 41 across a range of positions. This relative positioning can be used to determine any additional force applied to the end 41 of the arm 40 by the brazing wire delivery cable 52, and the additional force may be accounted for in a correction or adjustment of the lateral force value determined by the lateral force sensor 46 during a laser brazing process, as will be described in greater detail below.

The laser brazing head 30 further includes one or more sensors configured to determine relative positioning between the arm 40 and the support body 32. In the illustrated example, an angle sensor or angle encoder (45: FIGS. 3B-3C) is configured to determine relative angular positioning between the arm 40 and the support body 32 as the arm 40 is moved by the motor 36. As illustrated in FIG. 3B, the measured angle may be representative of an angle C between an axis B of the arm 40 and an axis A of the support body 32. The arm 40 may be rotated relative to the support body 32 as the laser brazing head 30 is moved relative to the components 10 and 12 to adjust the lateral force applied to the component 10 by the end 41 (e.g., the brazing wire 44, filling wire or the tracking finger 43) so the end 41 can be properly positioned along a seam between the components 10 and 12, or both.

As the arm 40 is moved relative to the support body 32, it is also moved relative to the wire feeder 50. This may change tension on the wire delivery cable 52 and, in turn, may change forces applied to the end 41 of the arm 40 by the wire delivery cable 52. Accordingly, the angle encoder 45 is configured to determine the relative positioning between the arm 40 and the support body 32 across a range of "process-relative" positions so that any additional force applied to the end 41 of the arm 40 by the wire delivery cable 52 may be accounted for in a correction or adjustment of the lateral force value determined by the lateral force sensor 46 during a laser brazing process, as will be described in greater detail below.

In addition to or in lieu of the angle encoder 45 to determine the relative angular positioning between the arm 40 and the support body 32, the angular positioning between the arm 40 and the support body 32 may be determined in some arrangements by a first orientation sensor (e.g., 48; FIGS. 3A, 3C) positioned on the arm 40 and a second orientation sensor (not shown) positioned on the support body 32. In this arrangement, changes in the orientation determined by the first and second orientation sensors may be used to determine the angular positioning between the arm 40 and the support body 32. In still other arrangements, in addition to or in lieu of rotating relative to the support body 32, the arm 40 may translate along or relative to the support body 32. In these arrangements, a position sensor (not shown) may be provided on the arm 40 to determine relative positioning between the arm 40 and the support body 32 as the arm 40 is translated relative to the support body 32.

As will be appreciated and as shown in FIG. 3C, a number of optical elements deliver the laser beam LB through the laser processing head 30 to the components 10, 12. An optical fiber 60 delivers the laser beam LB to the head 30, and a series of elements including a collimator 61, reflectors 62 and 63, and focusing lens 64 route the laser beam LB via a cover slide 65 out of the head 30 toward the components 10, 12 to be joined. As noted, the motor 36 can articulate the arm 40 relative to the support body 32, and the encoder 45 can measure the angular orientation. The orientation sensor 48 can be disposed on the arm 40 to measure the orientation relative to gravity, and the lateral force sensor 46 can be disposed on the arm 40 to measure lateral force of the end 41 positioned against at least one of the components 10, 12 as disclosed herein. The Z position sensor 47 determines the relative distance along axis B of the arm 40 relative to the components 10, 12.

As shown, the Z position sensor 47 can use a biasing element 49 so that the element is extended, and the Z position sensor 47 can be connected to the focusing lens 64 to change the focal point of the laser beam LB based on the distance of the arm from the components 10, 12. As noted, the wire feed device (50) can feed brazing wire 44 or the like by the feed cable 52 to the end 41 of the arm 40, which is used to follow the seam of the components 10, 12 where the laser beam LB is delivered to perform the brazing. As already noted, the end 41 can include a wire feed nozzle 42 on a probe, and the brazing wire 44 can be fed from the nozzle in an insulated manner.

As further shown in FIG. 3C, one or more control units or controllers 80 can used for performing the techniques disclosed herein. The one or more controllers 80 are in communication with the various sensors, including the lateral force sensor 46, the encoder 45, the Z position sensor 47, and the orientation sensor 48. The one or more controllers 80 can be a separate control unit from other control equipment of the brazing head 30 or can be integrated into existing equipment. Either way, the one or more controllers 80 can used any conventional processing equipment, memory, communication interfaces, and the like suitable to an implementation at hand.

Figure 4:
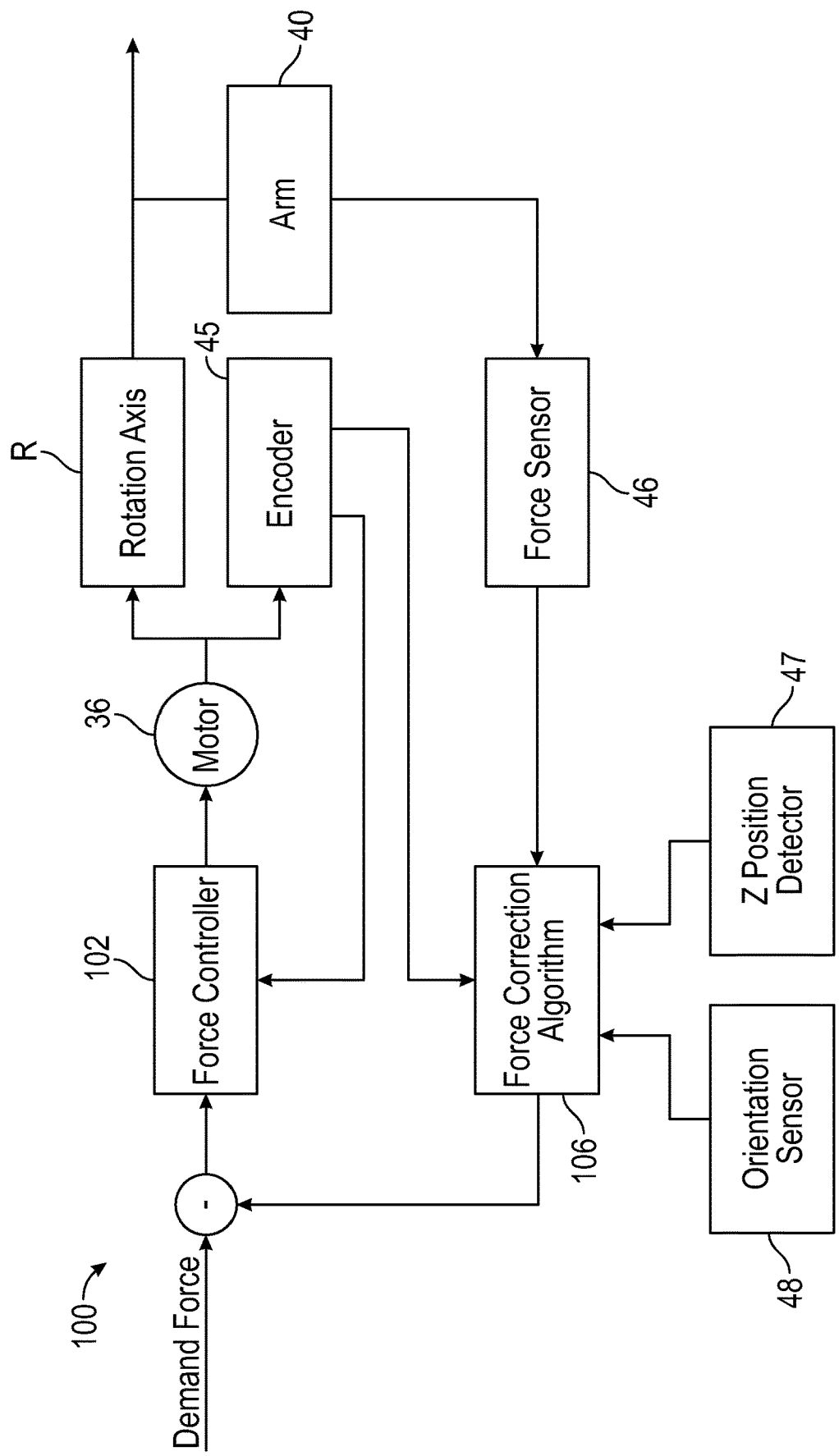
FIG. 4 is a schematic illustration of a control process used in a laser brazing method of the present disclosure.

FIG. 4 provides a schematic illustration of one non-limiting control process, technique or method 100 for operating the laser brazing head 30. In method 100, a force controller 102 is structured to control actuation or operation of the motor 36 to change the position of the arm 40 relative to a rotation axis (R: FIGS. 3A-3C) and to maintain application of a constant or substantially constant force to the respective component (10, 12) by the end (41) (e.g., brazing wire 44, filling wire or the tracking finger 43). When the arm 40 is in a given position relative to the support body (32), the lateral force sensor 46 determines a lateral force value as the end (41) (brazing wire 44, filling wire or the tracking finger 43) is positioned against and applies a lateral force to the respective component 10. In addition, the angle encoder 45 measures and determines a relative angular position between the arm 40 and the support body (32), the orientation sensor 48 determines the orientation of, for instance, the arm 40 relative to gravity, and the Z position sensor 47 determines the relative position of the end (41) of the arm 40 relative to the components 10 and 12 and the frame (34) on which the wire feeder (50) is positioned. The end 41 is touching at least one components 12 along the axis due to the bias 49. The Z position sensor 47 measures how far the end 41 has "moved out" along the axis.

The determined lateral force value, the determined relative angular position between the arm 40 and the support body (32), the determined orientation of the arm 40, and the determined relative position of the end (41) of the arm 40 are all provided to a force correction controller 106. This force correction controller 106 is structured to correct or adjust the determined lateral force value to provide a correct or adjusted lateral force value. Similarly, the lateral force value provided by the force correction controller 106 accounts for the variable forces which act upon the end (41) of the arm 40 of the laser brazing head 30 in addition to those forces which are encountered due to the positioning of the end (41) (brazing wire 44, filling wire or the tracking finger 43) against the component 12. This is done to provide a lateral force value which is more accurately representative of the actual force which is being applied to the component 12.

The force correction controller 106 may also be configured to determine if the lateral force value it provides deviates from a targeted or predetermined lateral force value or falls outside of a range of acceptable lateral force values which should be applied to the component 12 during the laser brazing process. If the lateral force value provided by the force correction controller 106 does not need adjustment, then the method 100 may continue without any adjustment by the force controller 102 to the motor 36 and, in turn, the arm 40. As will be appreciated, the control loop 100 is continually correcting the force.

However, if the lateral force value provided by the force correction controller 106 needs adjustment, then the force correction controller 106 may provide a corresponding indication to the force controller 102 which may, in turn, control the motor 36 as appropriate to adjust the positioning of the arm 40 to change the amount of force applied to the component 12 and to maintain application of a constant or substantially constant force to the component 12. In one embodiment, the method 100 is suitable for maintaining the lateral force applied to the component to within 0.1-N of a targeted or predetermined value, although other variations are possible. In addition to or in lieu of adjusting the positioning of the arm 40, the amount of force applied to the component 10 may be altered by translating positioning of the laser brazing head 30 relative to the components 10 and 12, although other variations for effecting an adjustment in the amount of lateral force applied to the components 10 and 12 are possible.

In one non-limiting arrangement, the force correction controller 106 may be programmed with a number of lateral force values which have been previously recorded by the lateral force sensor 46 in the absence of any lateral force being applied against the component 10 by the end (41) (e.g., brazing wire 44, filling wire or the tracking finger 43) as the arm 40 is moved through a process relevant range of orientations of the arm 40, positioning of the arm 40 relative to the wire feeder (50), and angles of the arm 40 relative to the support body (32). For each recorded lateral force value, the orientation of the arm 40, the position of the arm 40 relative to the wire feeder (50), and the angle of the arm 40 relative to the support body (32) may also be recorded and correlated with a respective lateral force value. In this case, the orientation of the head 30 would need to be varied within the process relevant range as well. The same may being considered for moving the end 41 along axis B. In other words, the process may need to go through all process relevant combinations of angle, orientation, and maybe also position Z.

During execution of the method 100 in this arrangement, for example, the force correction controller 106 can correlate the determined relative angular position between the arm 40 and the support body (32), the determined orientation of the arm 40, and the determined relative position of the end (41) of the arm 40 relative to the components 10 and 12 and the frame (34) with one of the recorded lateral force values to identify a correction or adjustment value which should be applied to the lateral force value sensed by the lateral force sensor (46). In one arrangement, the force correction controller 106 provides the lateral force value by subtracting the recorded lateral force value identified by the force correction controller 106 from the lateral force value sensed by the lateral force sensor 46. However, other variations are possible.

In the event there is not a recorded lateral force value corresponding to a given set of parameters for the determined relative angular position between the arm 40 and the support body (32), the determined orientation of the arm 40, and the determined relative position of the end (41) of the arm 40 relative to the components 10 and 12 and the frame (34), then the force correction controller 106 may also be configured to calculate and provide the lateral force value through interpolation or extrapolation from the other recorded lateral force values.

As described above, the lateral force value determined by the lateral force sensor 46 is corrected or adjusted based on: (i) the determined relative angular position between the arm 40 and the support body (32), (ii) the determined orientation of the arm 40 with respect to gravity, and (iii) the determined relative position of the end (41) of the arm 40 relative to the components 10 and 12 and the frame (34). However, arrangements in which the lateral force value determined by the lateral force sensor 46 is corrected or adjusted based on: (i) the determined relative angular position between the arm 40 and the support body (32) and (ii) the determined orientation of the arm 40 or of the support body (32) are also possible.

While not previously discussed, it should be appreciated that the force controller 102, the force correction controller 106, or both may be part of a processing subsystem that may be structured with controllers, modules, sensors, actuators, communication links, and other devices known in the art for performing the operations described herein. The force controller 102, the force correction controller 106, or both may be a single device or a distributed device, and the functions of the force controller 102, the force correction controller 106, or both may be performed by hardware or software. All commands and information may be provided in alternate forms, some information may not be present in certain embodiments, and additional information may be present in certain embodiments. Information may be interpreted from sensor inputs, from datalink communications, from parameters on a storage medium readable by a computer, or through other information gathering devices understood in the art.

In certain embodiments, the force controller 102, the force correction controller 106, or both include one or more modules structured to functionally execute its operations, which underscores the structural independence of the aspects of the force controller 102 or the force correction controller 106 and illustrates one grouping of operations and responsibilities of force the controller 102 or the force correction controller 106. Other groupings that execute similar overall operations are understood within the scope of the present application. Modules may be implemented in hardware and/or software on computer readable medium, and modules may be distributed across various hardware or software components.

Finally, the techniques according to the present disclosure can be used to calibrate the operation of the brazing head 30 to account for lateral force corrections. For the calibration method, the brazing head 30 or one or more components (e.g., arm 40) of the brazing head 30 are moved through a range of configurations in the absence of interaction of the brazing head 30 or a component of the brazing head 30 with a components 10, 12 during a joining process of the workpiece 10, 12. In particular and in the absence of interaction with a workpiece, the motor 36 is operated in the calibration process to actively move at least the arm 40 through a process relevant range of orientations (i.e., a range of orientations that the arm 40 would have during a brazing operation or could be moved during a brazing operation). Lateral force values are sensed in connection with the brazing head 30 as the arm 40 is moved through the range of configurations. A correction value is then determined which should be applied to a lateral force value sensed during the joining process when the brazing head 30 or one or more components (40) thereof is actually moved in a particular configuration and when a brazing wire, filling wire or tracking finger extending from the brazing head 30 is positioned against and applies a lateral force to the workpiece 10.

In the calibration, orientation of the brazing head 30 can be determined relative to gravity to provide a determined orientation of the brazing head 30; and a position of an arm 40 of the brazing head 30 can be determined relative to a support body 32 of the brazing head 30 to provide a determined position of the arm relative to the support body. Additionally, relative positioning can be determined between the arm 40 and the wire feeder 50 positioned on a frame to which the support body 32 is coupled to provide a determined relative position between the arm 40 and the wire feeder 50. In this way, determining the correction value as disclosed herein can be based on the determined orientation of the brazing head 30, the determined position of the arm 40 relative to the support body 32, and the determined relative position between the arm 40 and the wire feeder 50.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for joining components, the method comprising:
   positioning an arm of a brazing head adjacent at least one of the components, the arm having an end;
   sensing a first lateral force value of at least a portion of the arm, wherein sensing the first lateral force value comprises sensing with a lateral force sensor disposed on the arm, the end of the arm being below the lateral force sensor;
   determining a gravitational orientation associated with the brazing head;

positioning at least a portion of the arm against the at least one component;

determining a second lateral force value based on the first lateral force value, the gravitational orientation, and a mass of the end of the arm; and repositioning at least a portion of the brazing head relative to the at least one component in response to the second lateral force value deviating from a target value.

2. The method of claim 1, wherein positioning the arm of the brazing head adjacent the at least one component comprises positioning an element on the arm against the at least one component, the element including at least one of a portion of a wire used in the brazing process, a surface of the arm, and a tracking finger extending from the arm.

3. The method of claim 1, wherein determining the gravitational orientation associated with the brazing hear comprises using an orientation sensor disposed on the brazing head or on a part thereof.

4. The method of claim 1, wherein sensing the second lateral force value comprises sensing with the lateral force sensor disposed on the arm.

5. The method of claim 1, wherein sensing the first lateral force value comprises sensing with data of a motor coupled to the arm.

6. The method of claim 1, wherein repositioning at least the portion of the brazing head comprises moving the arm relative to the support body.

7. The method of claim 1, further comprising:
feeding a wire from a wire feeder positioned on the brazing head; and
delivering the wire through a wire delivery cable extending between the wire feeder and a portion of the arm.

8. The method of claim 7, further comprising:
applying a laser from the brazing head to the wire fed to the portion of the arm; and
moving the brazing head along a joint between the components.

9. The method of claim 1, further comprising:
determining a relative position of the arm in relation to a support body of the brazing head supporting the arm; and
using the relative position in the calculation of the second lateral force value.

10. The method of claim 9, wherein determining the first relative position of the arm in relation to the support body comprises:
measuring the relative position with an angular encoder disposed proximate to an interface between the arm and the support body; or
measuring the relative position with two orientation sensors, a first of the two orientation sensors associated with the support body, a second of the two orientation sensors associated with the arm.

11. The method of claim 1, further comprising:
determining a relative position between the arm and its end; and
using the relative position in the calculation of the second lateral force value.

12. The method of claim 1, wherein determining the second lateral force value comprises compensating for variable forces attributable to mass of at least one of a portion of the brazing head and wire delivery cable coupled to the arm.

13. A system for joining components, the system comprising:
a brazing head including a support body and an arm, the arm being coupled to and movable relative to the support body, wherein the arm has an end;
a lateral force sensor disposed on the arm, the end of the arm being below the lateral force sensor, the lateral force sensor being configured to sense a first lateral force value of at least a portion of the arm;
an orientation sensor configured to determine an gravitational orientation associated with the brazing head; and
a controller in communication with the force sensor and, the orientation sensor, wherein the controller is configured to:
position at least a portion of the arm against the at least one component;
determine a second lateral force value based on the first lateral force value, the gravitational orientation, and a mass of the end of the arm; and
reposition at least a portion of the brazing head relative to the at least one component in response to the second lateral force value deviating from a target value.

14. The system of claim 13, wherein the brazing head comprises a wire feeder coupled to the support body, the wire delivery cable extending between the wire feeder and part of the arm.

15. The system of claim 13, comprising a position sensor configured to determine a relative position between the arm and the end of the arm, the controller being configured to use the relative position in the determination of the second lateral force value.

16. The system of claim 13, comprising a position sensor configured to determine a relative position of the arm in relation to the support body, the controller being configured to use the relative position in the determination of the second lateral force value.

17. The system of claim 13, wherein the controller is configured to adjust the first lateral force value sensed by the lateral force sensor to compensate for variable forces to the brazing head as the brazing head moves through a range of orientations during a brazing operation, wherein the range of orientations comprises orientations in which the end of the arm deviates from vertical and the end of the arm varies its orientation with respect to vertical.

18. The method of claim 12, wherein the compensating for variable forces variable forces comprises the compensating for variable forces variable forces through a range of orientations during the method for joining operation, wherein the range of orientations comprises orientations in which the end of the arm deviates from vertical and the end of the arm varies its orientation with respect to vertical.

19. The method of claim 12, wherein determining the second lateral force values comprises compensating for a tension of the wire delivery cable.

20. The method of claim 12, wherein a tension of a wire deliver cable is determined using a Z position sensor positioned on the arm.

* * * * *